US012078805B2

(12) United States Patent
Ito

(10) Patent No.: US 12,078,805 B2
(45) Date of Patent: Sep. 3, 2024

(54) HEAD-MOUNTED DISPLAY

(71) Applicant: JVCKENWOOD Corporation, Yokohama (JP)

(72) Inventor: Fumihiko Ito, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 560 days.

(21) Appl. No.: 17/356,158

(22) Filed: Jun. 23, 2021

(65) Prior Publication Data

US 2021/0318543 A1    Oct. 14, 2021

Related U.S. Application Data

(63) Continuation of application No. PCT/JP2019/044237, filed on Nov. 12, 2019.

(30) Foreign Application Priority Data

Feb. 19, 2019   (JP) ................. 2019-027170
Feb. 19, 2019   (JP) ................. 2019-027171

(51) Int. Cl.
*G02B 27/01*    (2006.01)
*G02B 5/20*    (2006.01)
*G02B 27/28*    (2006.01)
*G02F 1/15*    (2019.01)
*G06F 3/01*    (2006.01)
*H04R 1/02*    (2006.01)
*H04R 1/34*    (2006.01)

(52) U.S. Cl.
CPC ......... *G02B 27/0172* (2013.01); *G02B 5/205* (2013.01); *G02B 27/281* (2013.01); *G02B 27/283* (2013.01); *G02B 2027/0132* (2013.01)

(58) Field of Classification Search
CPC .. G02B 27/0172; G02B 5/205; G02B 27/281; G02B 27/283; G02B 2027/0132
USPC ........................................................... 359/489
See application file for complete search history.

(56) References Cited

U.S. PATENT DOCUMENTS

| 5,150,117 | A  | 9/1992  | Hamilton et al. |
| 5,977,935 | A  | 11/1999 | Yasukawa et al. |
| 6,023,253 | A  | 2/2000  | Taniguchi et al. |
| 6,320,559 | B1 | 11/2001 | Yasukawa et al. |
| 2002/0126066 | A1 | 9/2002 | Kinebuchi |
| 2015/0355521 | A1 | 12/2015 | Alton et al. |
| 2017/0315417 | A1 | 11/2017 | Alton et al. |

(Continued)

FOREIGN PATENT DOCUMENTS

| CN | 106415383 A | 2/2017 |
| CN | 107589546 A | 1/2018 |
| JP | H04221920 A | 8/1992 |

(Continued)

*Primary Examiner* — Joseph P Martinez
*Assistant Examiner* — Grant A Gagnon
(74) *Attorney, Agent, or Firm* — Procopio, Cory, Hargreaves & Savitch LLP

(57) ABSTRACT

Provided is a head-mounted display that allows a user to see an outside view properly. The head-mounted display includes a combiner configured to combine display light for forming a display image with outside light from in front of a user wearing a head-mounted display, and a light reducing unit configured to transmit a part of outside light from below the combiner and have transmittance equal to or lower than transmittance of the combiner.

7 Claims, 10 Drawing Sheets

(56) References Cited

U.S. PATENT DOCUMENTS

2018/0188537 A1* 7/2018 Osterhout ............... G06F 3/012

FOREIGN PATENT DOCUMENTS

| JP | H07128614 A | 5/1995 |
| JP | H7-301762 A | 11/1995 |
| JP | H9-098985 A | 4/1997 |
| JP | H11-095160 A | 4/1999 |
| WO | 95/05620 A1 | 2/1995 |

* cited by examiner

HEAD-MOUNTED DISPLAY

CROSS REFERENCE TO RELATED APPLICATION

This application is a Bypass Continuation of PCT/JP2019/044237 filed on Nov. 12, 2019, which is based upon and claims the benefit of priority from Japanese patent application No. 2019-27170 filed on Feb. 19, 2019 and 2019-27171 filed on Feb. 19, 2019, the disclosure of which is incorporated herein in its entirety by reference.

BACKGROUND

The present invention relates to a head-mounted display.

Patent Literature 1 discloses a see-through head-mounted display. The head-mounted display shown in FIG. 5 of Patent Literature 1 (Japanese Unexamined Patent Application Publication No. H11-95160) includes a liquid crystal display device, a polarizing beam splitter, a concave half-mirror, a 1/4 wave plate, and a polarizing diffractive element. The polarizing beam splitter reflects s-polarized light and transmits p-polarized light. The polarizing diffractive element diffracts light in the polarization direction that is reflected by the polarizing beam splitter, and transmits light in the polarization direction that is transmitted by the polarizing beam splitter.

Further, the head-mounted display shown in FIG. 6 of Patent Literature 1 includes a liquid crystal display device, a concave half-mirror, a planar half-mirror, a first polarizing means, and a second polarizing means. The first polarizing means is a polarizing plate that transmits p-polarized light. The second polarizing means is a polarizing plate that absorbs p-polarized light and transmits s-polarized light. The two polarizing plates are placed in such a way that the transmission axes are orthogonal to each other.

SUMMARY

The structure of Patent Literature 1 has a problem that a difference arises in the brightness of outside light. For example, outside light from the front is attenuated by the half-mirror, the polarizing beam splitter and the like. On the other hand, for having a field of vision in the diagonally lower front to see a view lower than a display image, outside light from the diagonally lower front enters the user's eyes without passing through the half-mirror. The outside light from the diagonally lower front is viewed without being attenuated. This causes a problem that a difference in brightness arises between the outside light from the front and the outside light from the diagonally lower front.

The present disclosure has been accomplished to solve the above problems and an object of the present disclosure is thus to provide a head-mounted display that allows a user to see the outside view properly.

A head-mounted display according to an embodiment includes a combiner configured to combine display light for forming a display image with outside light from in front of a user wearing a head-mounted display, and a light reducing unit configured to transmit a part of outside light from below the combiner and have transmittance equal to or lower than transmittance of the combiner.

According to the present disclosure, there are provided a head-mounted display, a display method, and a display system that allow a user to see the outside view properly.

DETAILED DESCRIPTION

Specific embodiments of the present invention are described hereinafter in detail with reference to the drawings. The present disclosure, however, is not limited to the below-descried embodiments. The following description and the attached drawings are appropriately shortened and simplified to clarify the explanation.

Figure 1:
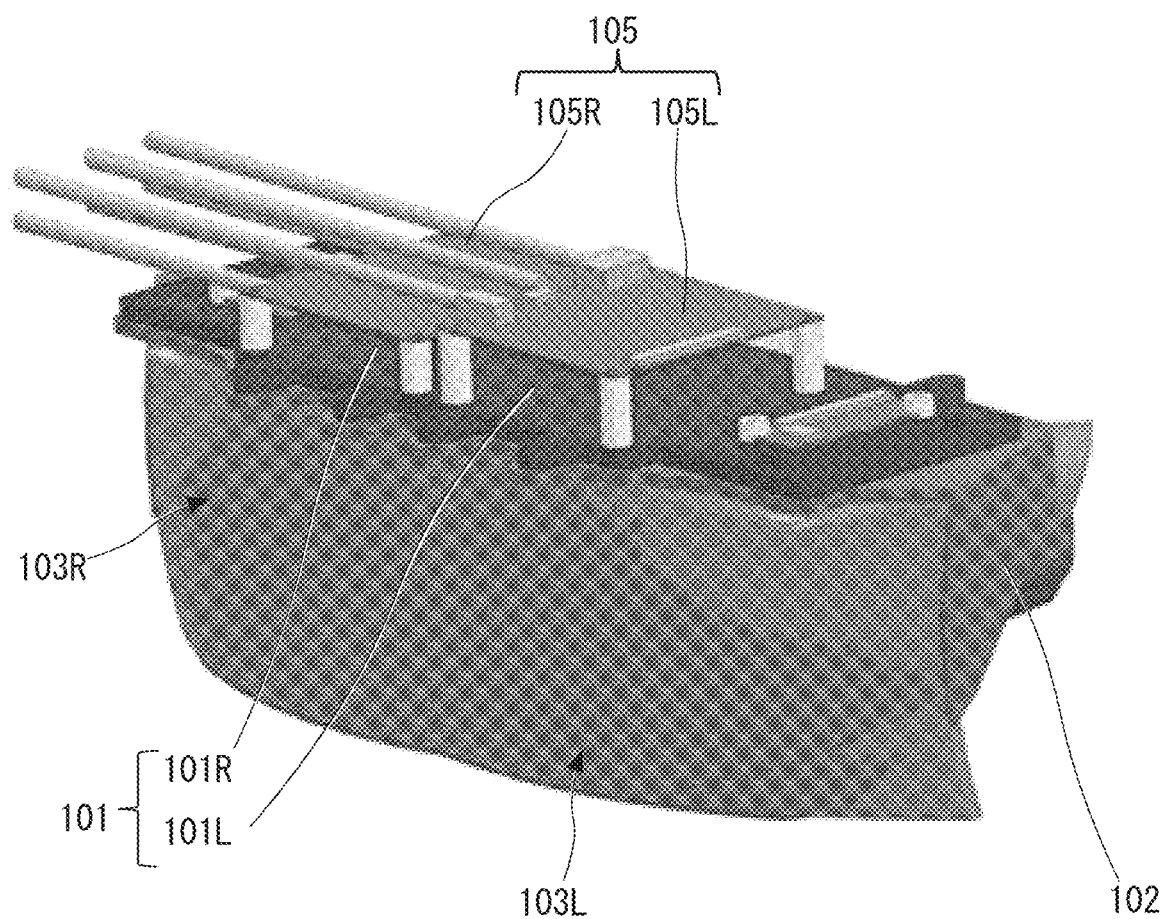
FIG. 1 is a view showing a part of the structure of a head-mounted display according to an embodiment.
Figure 1:
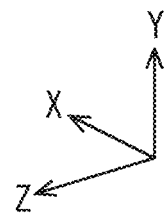
Figure 2:
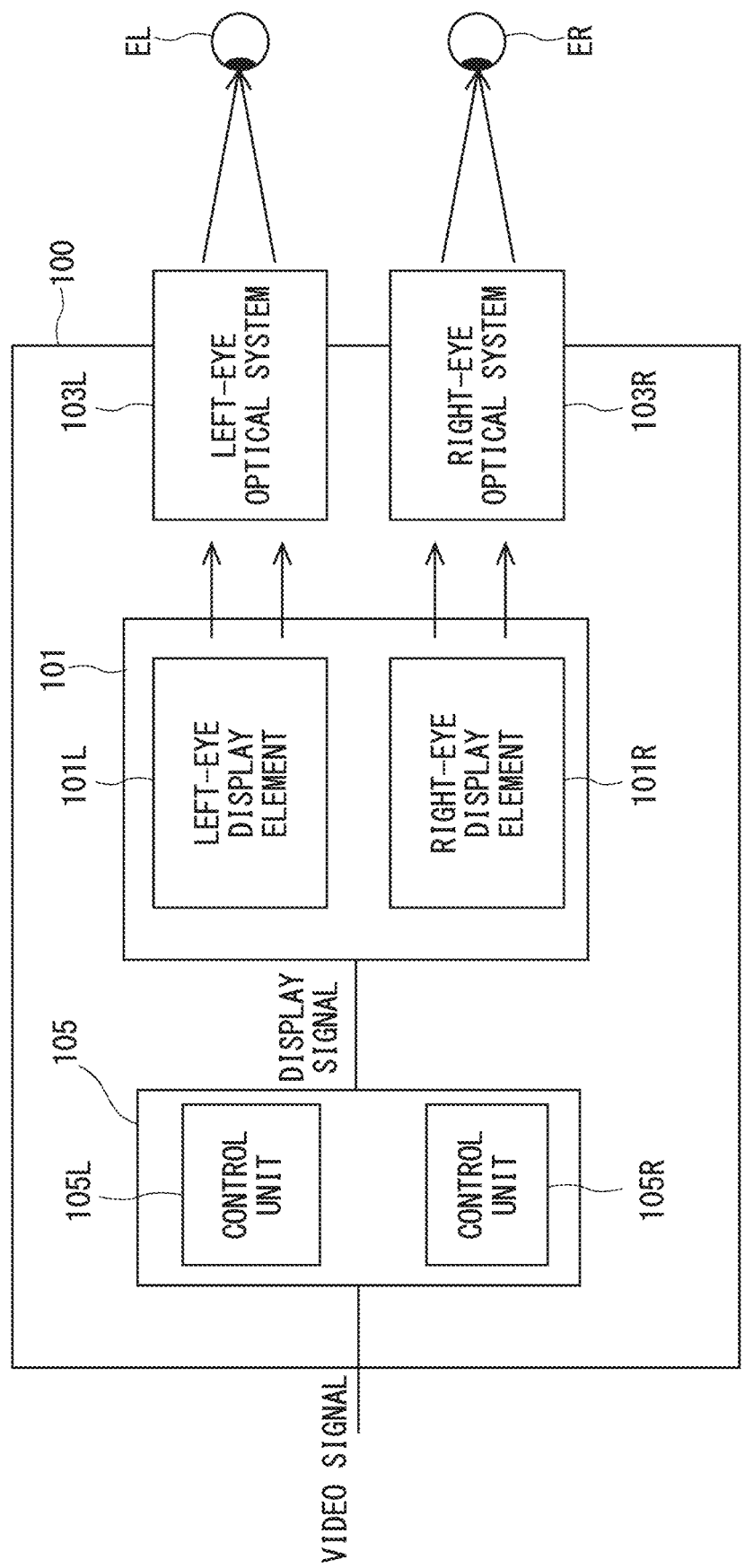
FIG. 2 is a view showing functional blocks of the head-mounted display according to the embodiment.

A head-mounted display and a display method of the same according to an embodiment are described hereinafter with reference to the drawings. FIG. 1 is a perspective view schematically showing a part of the structure of a head-mounted display 100. FIG. 2 is a view showing some of functional blocks of the head-mounted display 100. FIGS. 1 and 2 mainly show the structure related to image display of the head-mounted display 100. FIG. 1 shows the internal structure of the head-mounted display 100, and the elements shown in FIG. 1 may be covered with a cover or the like in practice.

The head-mounted display 100 is applicable to various purposes, such as game, entertainment, industrial, medical, and flight simulation purposes. The head-mounted display 100 may be an AR (Augmented Reality) head-mounted display or an MR (Mixed Reality) head-mounted display, for example.

To clarify the explanation, an XYZ three-dimensional Cartesian coordinate system is used in the following description. As viewed from a user, the front-back direction (depth direction) is Z direction, the left-right direction (horizontal direction) is X direction, and the up-down direction (vertical direction) is Y direction. The front direction is +Z direction, the back direction is −Z direction, the right direction is +X direction, the left direction is −X direction, the up direction is +Y direction, and the down direction is −Y direction.

The user, which is not shown, is wearing the head-mounted display 100. The head-mounted display 100 includes a display element unit 101, a frame 102, a left-eye optical system 103L, a right-eye optical system 103R, and a control unit 105. The control unit 105 includes a control unit 105L and a control unit 105R.

The frame 102 has goggles or glasses shape, and it is worn on the head of the user by a head band, which is not shown, or the like. The display element unit 101, the left-eye optical system 103L, the right-eye optical system 103R, the control unit 105L, and the control unit 105R are mounted on the frame 102. Note that, although the binocular head-mounted display 100 is shown in FIG. 1, the head-mounted display may be a glasses-shaped head-mounted display or a monocular head-mounted display.

The display element unit 101 includes a left-eye display element 101L and a right-eye display element 101R. The left-eye display element 101L generates a display image for a left eye. The right-eye display element 101R generates a display image for a right eye. Each of the left-eye display element 101L and the right-eye display element 101R includes a flat-panel display such as a liquid crystal monitor or an organic EL (Electro-Luminescence) monitor. The left-eye display element 101L and the right-eye display element 101R may be curve-shaped displays. Each of the left-eye display element 101L and the right-eye display element 101R includes a plurality of pixels arranged in an array. The array arrangement is not limited to two-dimensional matrix arrangement, and it may be PenTile arrangement or the like. The left-eye display element 101L is placed on the left side (−X side) of the right-eye display element 101R.

The control unit 105 is placed above (on the +Y side) of the display element unit 101. A video signal, a control signal, and power from the outside are supplied to the control unit 105. For example, a video signal and the like are input to the control unit 105 by wired connection such as HDMI (registered trademark) or wireless connection such as WiFi (registered trademark) or BlueTooth (registered trademark). The head-mounted display 100 may include a video generation unit (not shown) that generates a video signal, and a video signal or the like generated by the video generation unit may be input to the control unit 105.

The control unit 105L and the control unit 105R include hardware resources such as a CPU (Central Processing Unit), a memory and the like, and operates according to a computer program stored in the memory. Further, each of the control unit 105L and the control unit 105R includes a display driving circuit or the like. The control unit 105L generates a display signal of a left-eye image on the basis of a video signal, a control signal and the like and outputs it to the left-eye display element 101L. The left-eye display element 101L thereby outputs display light for displaying the left-eye image. The control unit 105R generates a display signal of a right-eye image on the basis of a video signal, a control signal and the like and outputs it to the right-eye display element 101R. The right-eye display element 101R thereby outputs display light for displaying the right-eye image. In this manner, the control unit 105 outputs display signals to the display element unit 101.

Note that the display element unit 101 does not necessarily have the structure in which the left-eye display element 101L and the right-eye display element 101R are separate display elements, and it may have a single display element. The single display element may generate a display image for a left eye and a display image for a right eye. In this case, the display element unit 101 generates a left-eye image by using a part on one side of the display area of the display and generates a right-eye image by using a part on the other side of the display area of the display.

Some or all of the display element unit 101, the control unit 105 and the like are not necessarily fixed to the frame 102, and they may be mounted detachable from the frame 102. For example, the display element unit 101, the control unit 105 and the like may be implemented by mounting a smartphone or a tablet computer on the frame 102. In this case, an application program (app) that generates display images for the head-mounted display is previously installed into the smartphone or the like.

The left-eye optical system 103L guides the display light that is output from the left-eye display element 101L to the left eye EL of the user as a left-eye image. The right-eye optical system 103R guides the display light that is output from the right-eye display element 101R to the right eye of the user as a right-eye image. The left-eye optical system 103L is placed on the left side (−X side) of the right-eye optical system 103R. The left-eye optical system 103L is placed in front (+Z direction) of the left eye EL of the user. The right-eye optical system 103R is placed in front (+Z direction) of the right eye ER of the user. The user can see a virtual image of a display image generated by the display element unit 101 in the front (in the +Z direction).

The head-mounted display 100 according to this embodiment is a semitransparent head-mounted display 100. Thus, the left-eye optical system 103L and the right-eye optical system 103R include a combiner, which is described later. In the semitransparent head-mounted display 100, display light from the display element unit 101 and outside light enter the left eye EL and the right eye ER. Thus, the user can see a superimposed image on which a display image is superimposed on a view in the front (in the +Z direction).

Specific embodiments of the left-eye optical system 103L and the right-eye optical system 103R (which are collectively referred to simply as an optical system below) is described hereinafter. Note that the left-eye optical system 103L and the right-eye optical system 103R have the same structure, and therefore only the left-eye optical system 103L is described in the following description.

First Embodiment

Figure 3:
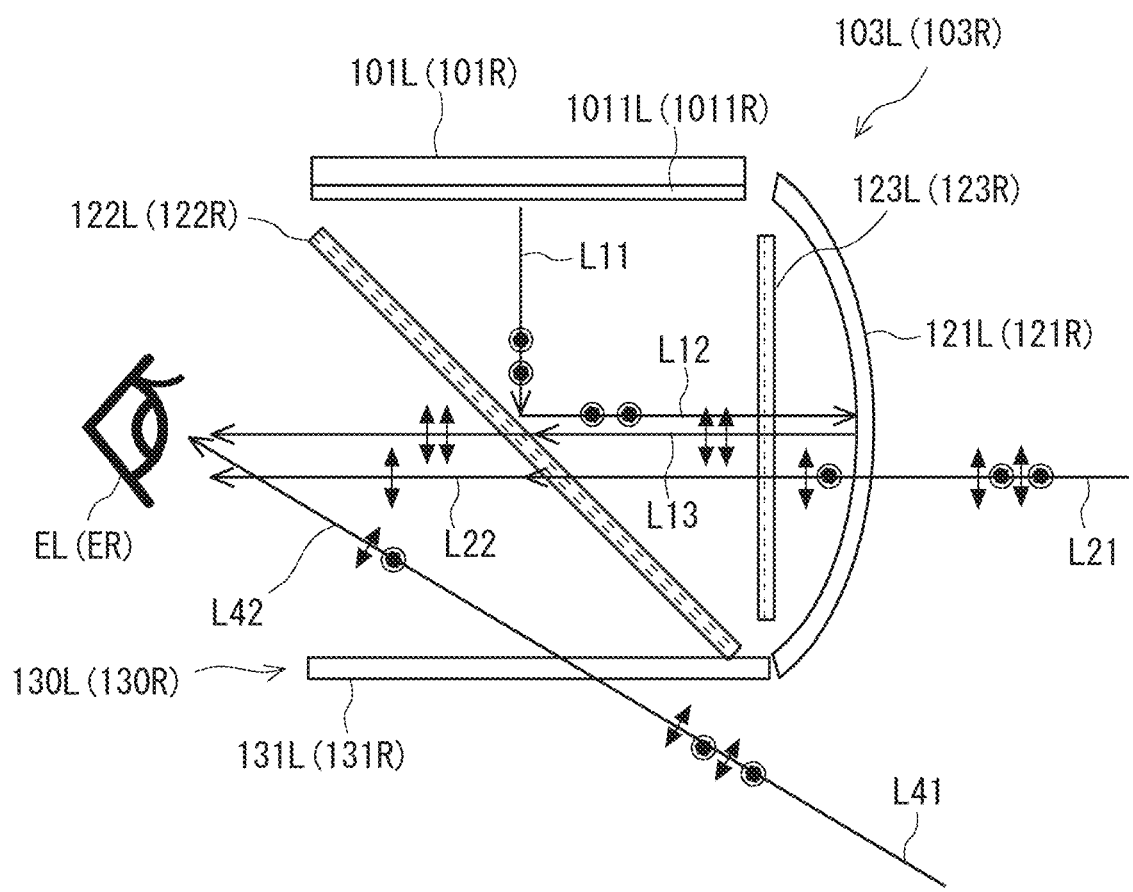
FIG. 3 is a view schematically showing the structure of an optical system of a head-mounted display according to a first embodiment.

FIG. 3 is a side view schematically showing an optical system according to a first embodiment. The left-eye optical system 103L includes a combiner 121L, a polarizing beam splitter 122L, a 1/4 wave plate 123L, and a light reducing unit 130L. The combiner 121L, the polarizing beam splitter 122L, the 1/4 wave plate 123L, and the light reducing unit 130L are fixed to the frame 102 shown in FIG. 1.

The combiner 121L, the polarizing beam splitter 122L, and the 1/4 wave plate 123L are placed in front (+Z direction) of the user's left eye EL. Further, the combiner 121L is placed in front (+Z direction) of the polarizing beam splitter 122L. The 1/4 wave plate 123L is placed between the combiner 121L and the polarizing beam splitter 122L. Thus, the combiner 121L, the 1/4 wave plate 123L, the polarizing beam splitter 122L, and the left eye EL are sequentially located from +Z side to −Z side.

The left-eye display element 101L is placed above (in the +Y direction) the polarizing beam splitter 122L. Thus, the left-eye display element 101L is placed diagonally above in front of the left eye EL. The light reducing unit 130L is placed below (in the −Y direction) the polarizing beam splitter 122L. Thus, the light reducing unit 130L is placed diagonally below in front of the left eye EL.

The combiner 121L is a beam splitter such as a half-mirror, and it reflects a part of incident light and transmits a part of incident light. Thus, when it is assumed that the percentage of reflection of display light L12, which is described later, in the combiner 121L and the percentage of reflection of outside light L21 from the front (+Z direction)

of the user are equal, approximately half of the outside light L21 passes through the combiner 121L. The combiner 121L is a concave mirror. The combiner 121L may increase the percentage of reflection of the display light L12 and decrease the percentage of transmission of the outside light L21, or may decrease the percentage of reflection of the display light L12 and increase the percentage of transmission of the outside light L21.

The polarizing beam splitter 122L transmits or reflects light depending on the polarization state. A reflective polarizing plate may be used as the polarizing beam splitter 122L. The transmission axis of the polarizing beam splitter 122L is parallel to the plane of paper. In FIG. 3, the polarizing beam splitter 122L transmits the polarization component that is parallel to the plane of paper, and reflects the polarization component that is orthogonal to the plane of paper. The polarizing beam splitter 122L transmits p-polarized light and reflects s-polarized light. When non-polarized light is incident on the polarizing beam splitter 122L, it is split into p-polarized transmitted light and s-polarized reflected light.

The 1/4 wave plate 123L gives a phase difference of 90° to an orthogonal polarization component. The polarization state of light changes as the light passes through the 1/4 wave plate 123L. For example, linearly polarized light is converted into circularly polarized light as it passes through the 1/4 wave plate 123L. Circularly polarized light is converted into linearly polarized light as it passes through the 1/4 wave plate 123L. The 1/4 wave plate 123L is placed in parallel to the XY-plane.

The light reducing unit 130L includes a light reducing filter 131L such as an ND (Neutral Density) filter. In this example, an ND filter with transmittance of 25% is used as the light reducing unit 130L. The light reducing unit 130L functions as a lower window for obtaining a field of vision in the diagonally lower front. Outside light L41 coming from the diagonally lower front and going toward the left eye EL passes through the light reducing filter 131L. Since the user sees the diagonally lower front through the light reducing filter 131L, a downward field of vision corresponding to the area size of the light reducing filter 131L is obtained. The light reducing filter 131L is placed in parallel to the XZ-plane. The angle of mounting the light reducing filter 131L is not particularly limited. For example, the light reducing filter 131L may be placed at an angle in such a way that it is higher on the −Z side and lower on the +Z side. The light reducing unit 130L is placed outside the optical path of display light from the combiner 121L to the left eye EL.

Display light L11 from the left-eye display element 101L is described hereinafter. The display surface of the left-eye display element 101L faces vertically downward (in the −Y direction). Thus, the display light L11 from the left-eye display element 101L is output in the −Y direction. The left-eye display element 101L is a liquid crystal monitor having a liquid crystal display panel, for example. The liquid crystal display panel controls the polarization state of light from a backlight and thereby spatially modulates the light. Therefore, a polarizing film 1011L is attached onto the output side of the liquid crystal panel of the left-eye display element 101L. The polarizing film 1011L transmits linearly polarized light that is orthogonal to the plane of paper and absorbs linearly polarized light that is parallel to the plane of paper. Thus, the display light L11 is linearly polarized light. In FIG. 3, the display light L11 is linearly polarized light in the direction orthogonal to the plane of paper, and this direction is referred to as a first direction.

The polarizing beam splitter 122L is placed at an angle below (in the −Y direction) the left-eye display element 101L. The polarizing beam splitter 122L reflects the display light L11 forward (in the +Z direction). The polarizing beam splitter 122L reflects the display light L11 toward the combiner 121L. The display light L11 is s-polarized light with respect to the polarizing beam splitter 122L. Substantially the whole of the display light L11 is reflected by the polarizing beam splitter 122L. Reflected light of the display light L11 that has been reflected forward (in the +Z direction) by the polarizing beam splitter 122L is referred to as display light L12.

The display light L12 that has been reflected by the polarizing beam splitter 122L enters the combiner 121L through the 1/4 wave plate 123L. The combiner 121L reflects the display light L12 backward (in the −Z direction). The combiner 121L reflects the display light L12 toward the polarizing beam splitter 122L. Further, the combiner 121L is a concave mirror, and reflects the display light L12 so as to focus the display light L12 toward the left eye EL. Reflected light of the display light L12 that has been reflected by the combiner 121L is referred to as display light L13. The display light L13 enters the polarizing beam splitter 122L through the 1/4 wave plate 123L.

The 1/4 wave plate 123L is placed between the combiner 121L and the polarizing beam splitter 122L. The display light that goes back and forth between the polarizing beam splitter 122L and the combiner 121L passes through the 1/4 wave plate 123L twice, and therefore the polarization direction of the display light rotates by 90°. Thus, the display light L13 is linearly polarized light that is orthogonal to the polarization direction of the display light L11. In FIG. 3, the display light L13 that has passed through the 1/4 wave plate 123L is linearly polarized light in the direction parallel to the plane of paper, and this direction is referred to as a second direction. The first direction and the second direction are orthogonal to each other in the plane orthogonal to the optical axis. The transmission axis of the polarizing beam splitter 122L is parallel to the second direction.

The display light L13 is p-polarized light with respect to the polarizing beam splitter 122L, and substantially the whole of the display light L13 passes through the polarizing beam splitter 122L. In this manner, by placing the 1/4 wave plate 123L between the polarizing beam splitter 122L and the combiner 121L, loss of display light is reduced.

The display light L13 that has passed through the polarizing beam splitter 122L enters the left eye EL. In this manner, the left-eye optical system 103L guides the display light from the left-eye display element 101L to the user's left eye EL. The display light L13 forms a display image. The optical system can display the virtual image in front (in the +Z direction) of the user.

Next, the outside light L21 from the front (+Z direction) of the user is described hereinafter. Approximately half of the outside light L21 from the front (+Z direction) of a user passes through the combiner 121L. The outside light L21 passes through the 1/4 wave plate 123L and then enters the polarizing beam splitter 122L. The polarizing beam splitter 122L splits the outside light L21 into two beams. The outside light L21 that has passed through the polarizing beam splitter 122L is referred to as outside light L22. The outside light L22 is linearly polarized light that is parallel to the plane of paper.

The p-polarization component of the outside light L21 passes through the polarizing beam splitter 122L and becomes the outside light L22. The outside light L22 in p-polarization enters the left eye EL. The s-polarization component of the outside light L21 is reflected by the polarizing beam splitter 122L and enters the left-eye display element 101L. When the outside light L21 is non-polarized light, it remains non-polarized after passing through the 1/4 wave plate 123L. Since it is considered that the non-polarized outside light L21 that has passed through the 1/4 wave plate 123L contains substantially the same proportion of the p-polarization component and the s-polarization component, the p-polarization component, which is the polarization component that occupies approximately half of the outside light L21, passes through the polarizing beam splitter 122L.

Since the head-mounted display 100 is semitransparent, the combiner 121L combines the outside light L21 from the front (+Z direction) and the display light L11 from the left-eye display element 101L. By placing the combiner 121L in front (in the +Z direction) of the user, the head-mounted display 100 functions as an optical see-through display. A display image is superimposed on a view in front (in the +Z direction) of the user. The user can thereby see a view on which a display image is superimposed.

The transmittance of the combiner 121L is 50%. Thus, half of the outside light L21 passes through the combiner 121L. Further, the outside light L21 passes through the polarizing beam splitter 122L. When the outside light L21 is non-polarized light, the transmittance of the polarizing beam splitter 122L for the outside light L21 is 50%. Approximately half of the outside light L21 that has passed through the 1/4 wave plate 123L passes through the polarizing beam splitter 122L. Thus, the outside light L21 is attenuated to 25% by passing through the combiner 121L and the polarizing beam splitter 122L. Therefore, 1/4 of the outside light L21 that has entered the combiner 121L enters the left eye EL. Note that the transmittance of the 1/4 wave plate 123L is 100% in this example.

Outside light L41 coming from the diagonally lower front and going toward the left eye EL is described hereinafter. The outside light L41 enters the light reducing filter 131L that serves as the lower window. The light reducing filter 131L transmits 25% of incident light and absorbs or reflects the remaining 75% of the light. A part of the outside light L41 passes through the light reducing filter 131L and enters the left eye EL. The outside light L41 that has passed through the light reducing filter 131L is referred to as outside light L42. The outside light L42 enters the left eye EL without through the polarizing beam splitter 122L. In this manner, a part of the outside light L41 coming from the diagonally lower front and going toward the left eye EL is blocked by the light reducing filter 131L, and a part of the light enters the left eye EL. By using the light reducing filter 131L as the lower window, a field of vision in the lower front is obtained.

The light reducing unit 130L is composed of the light reducing filter 131L with transmittance of 25%. The outside light L41 is attenuated to 25% by passing through the light reducing unit 130L. The outside light L42 that has been attenuated to 25% enters the left eye EL. Thus, the brightness of a view through the light reducing filter 131L and the brightness of a view through the combiner 121L are equal. The user can see the outside view properly.

The transmittance of the outside light L21 through the combiner 121L is Tc, the transmittance of the outside light L41 through the light reducing unit 130L is Tw, and the transmittance of the outside light L21 through the polarizing beam splitter 122L is Tm. Tw is preferably equal to or less than Tc. Further, Tw is preferably equal to or less than Tm. This reduces a difference in brightness between a view in the diagonally lower front and a view in the front. Since this prevents a field of vision in the diagonally lower front from being brighter than a field of vision in the front, the user is able to see a natural view. This improves the visibility of the head-mounted display 100.

By setting Tw to satisfy Tw=Tc*Tm, the brightness of a view in the front that is seen through the combiner 121L and the brightness of a view in the diagonally lower front that is seen through the light reducing unit 130L become equal. This reduces a difference in brightness depending on the viewing direction and thereby allows the user to see a natural view.

As described above, by using the light reducing unit 130L as the lower window, a field of vision is enlarged to cover the diagonally lower front, which allows the user to have a sense of openness when using the head-mounted display. A difference between the brightness of the outside light L22 from the front (+Z direction) that has passed the combiner 121L and the polarizing beam splitter 122L and the brightness of the outside light L42 from the diagonally lower front that has passed the light reducing unit 130L is reduced. The user can see the outside view properly. Further, since the user can see an area around the foot, the user can see operation equipment or the like mounted on a desk in front of the user, for example.

Although Tw=25%, Tc=50%, and Tm=50% in the above description, the values of transmittance are not particularly limited. For example, when the transmittance of Tc is set to 40%, lower transmittance is set to Tw. To be specific, Tw is preferably set to Tw=20% (=40%*50%).

Further, an antireflection coating may be applied to the surfaces of the optical elements such as the combiner 121L, the polarizing beam splitter 122L, the 1/4 wave plate 123L, and the light reducing filter 131L. This reduces stray light in the left-eye optical system 103L. Further, use of an absorptive ND filter as the light reducing filter 131L also reduces stray light in the left-eye optical system 103L.

The 1/4 wave plate 123L is placed between the polarizing beam splitter 122L and the combiner 121L. This reduces loss of the display light L11 from the left-eye display element 101L. It is possible to superimpose a high-contrast and bright display image on the view in the front.

Second Embodiment

Figure 4:
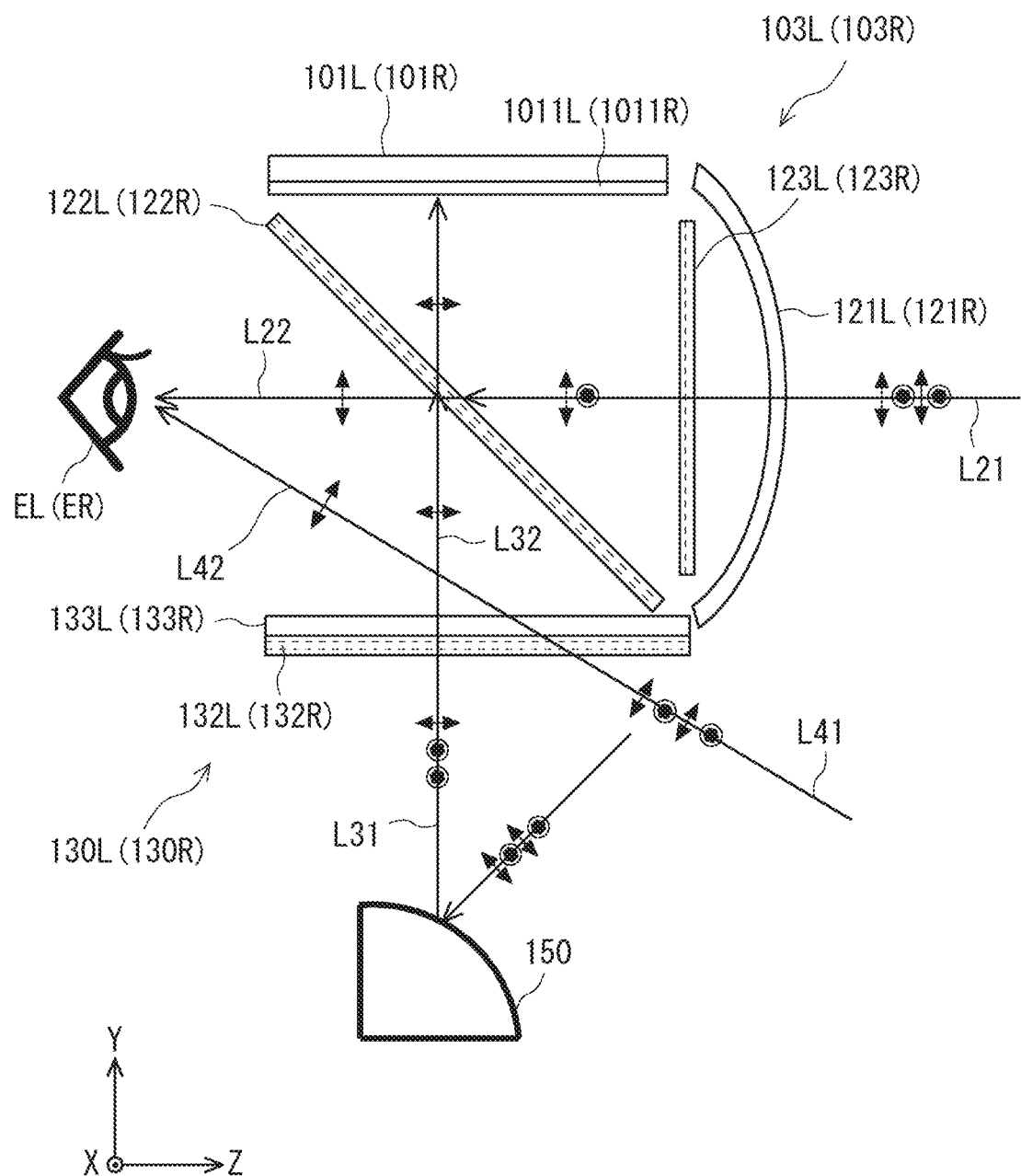
FIG. 4 is a view schematically showing the structure of an optical system of a head-mounted display according to a second embodiment.

The left-eye optical system 103L of the head-mounted display 100 according to a second embodiment is described hereinafter with reference to FIG. 4. In the second embodiment, the structure of the light reducing unit 130L is different from that in the first embodiment. The elements other than the light reducing unit 130L are the same as those of the first embodiment, and the description thereof is omitted. For example, in FIG. 4, display light L11 to L13 are the same as those of the first embodiment, and the illustration thereof is omitted. The light reducing unit 130L includes a polarizer 132L and a light reducing filter 133L.

An absorptive polarizing plate can be used as the polarizer 132L. The transmission axis of the polarizer 132L is parallel to the plane of paper. In FIG. 4, the polarizer 132L transmits the polarization component that is parallel to the plane of paper, and absorbs the polarization component that is orthogonal to the plane of paper. The polarizer 132L transmits p-polarized light and reflects s-polarized light. Note that a reflective polarizing plate may be used as the polarizer 132L. The polarizer 132L is placed in parallel to the XZ-plane.

The polarizer 132L is a wire grid polarizer or a dielectric film polarizer, for example. The polarizer 132L is not necessarily placed in parallel to the XZ-plane as shown in FIG. 4. For example, the polarizer 132L may be placed at an angle in such a way that it is higher on the −Z side and lower on the +Z side. A wire grid polarizer generally has better polarization properties compared with a dielectric film polarizer even when the angle of incidence of incident light is large. Having good polarization properties indicates being capable of transmitting polarized light in a desired direction and reflects polarized light in the other directions. Thus, in the case of placing the polarizer 132L at an angle, it is preferred to select a wire grid polarizer as the polarizer 132L. In the case of placing the polarizer 132L at an angle and selecting a dielectric film polarizer as the polarizer 132L, it is preferred to select a dielectric film polarizer having polarization properties optimized for the angle of incidence of unnecessary reflected light L31, which is described later.

The light reducing filter 133L is placed above (on the +Y side) the polarizer 132L. An ND filter with transmittance of 50% can be used as the light reducing filter 133L. Although the structure in which the light reducing filter 133L is layered above (on the +Y side) the polarizer 132L is shown in FIG. 4, the polarizer 132L and the light reducing filter 133L may be layered in the opposite order. For example, the polarizer 132L may be layered above (on the +Y side) the light reducing filter 133L. The light reducing filter 133L and the polarizer 132L may be formed integrally.

When the outside light L41 is non-polarized light, it is considered that the outside light L41 contains substantially the same proportion of the p-polarization component and the s-polarization component, and therefore the p-polarization component, which occupies 50% of the outside light L41, passes through the polarizer 132L. The outside light L41 that has passed through the polarizer 132L then passes through the light reducing filter 133L. Since the transmittance of the light reducing filter 133L is 50%, the transmittance of the light reducing unit 130L as a whole is 25% (=50%*50%). As in the first embodiment, the brightness of the front view and the brightness of the view in the diagonally lower front become equal.

The unnecessary reflected light L31 that is reflected by an object 150 such as a desk or clothing and goes upward (in the +Y direction) is described hereinafter. The unnecessary reflected light L31 enters the light reducing unit 130L, which is the lower window. The transmission axis of the polarizer 132L is parallel to the second direction. The polarizer 132L transmits p-polarized light and absorbs s-polarized light. Thus, only the p-polarization component of the unnecessary reflected light L31 passes through the light reducing unit 130L. The unnecessary reflected light L31 that has passed through the light reducing unit 130L is referred to as unnecessary reflected light L32.

Since the unnecessary reflected light L31 is reflected light that has been reflected by the object 150, it contains a greater proportion of the s-polarization component than the p-polarization component. Thus, by using the polarizer 132L that absorbs or reflects the s-polarization component, the unnecessary reflected light L31 is effectively shielded. Thus, by placing the polarizer 132L so as to transmit p-polarized light, the unnecessary reflected light L31 is shielded properly.

The unnecessary reflected light L32 that has passed through the polarizer 132L that absorbs or reflects the s-polarization component is p-polarized light. Further, as described earlier, the polarizing beam splitter 122L transmits p-polarized light and reflects s-polarized light. Therefore, the unnecessary reflected light L32, which is p-polarized light, is not reflected in the direction of the left eye EL by the polarizing beam splitter 122L. This prevents that the unnecessary reflected light L31 from the lower side of the user is viewed overlapping the display light L13 or the outside light L22. The degradation of contrast is thereby prevented.

Since the third aspect of Patent Literature 1 uses a diffraction grating, wavelength dependence arises. Therefore, in the third aspect of Patent Literature 1, there is a possibility that light with a specific wavelength contained in outside light from below is superimposed on a display image. On the other hand, this embodiment uses a polarizer with no wavelength dependence, and therefore outside light and display light are superimposed properly compared with the third aspect of Patent Literature 1.

The unnecessary reflected light L32 is linearly polarized light that is parallel to the plane of paper. The unnecessary reflected light L32 is p-polarized light with respect to the polarizing beam splitter 122L. Thus, substantially the whole of the unnecessary reflected light L32 passes through the polarizing beam splitter 122L and enters the left-eye display element 101L. The unnecessary reflected light L32 is absorbed by the polarizing film 1011L of the left-eye display element 101L. This prevents the unnecessary reflected light L32 from becoming stray light in the frame 102. This prevents that the unnecessary reflected light L32 from directly below (on the −Y side) the polarizing beam splitter 122L is viewed overlapping the display light L13, and thereby reduces the degradation of image quality.

The structure of this embodiment ensures a field of vision in the diagonally lower front and prevents that the unnecessary reflected light L32 from below overlaps the display light L13. It is possible to obtain a high quality display image by high-contrast and bright display light L13. Particularly, in an optical see-through head-mounted display used for AR or MR, it is important to obtain a high-contrast display image that is as bright as outside light. By employing the structure of this embodiment, it is possible to obtain the bright and high-contrast display image and properly superimposing outside light and display light. It is possible to superimpose the outside light and the display light.

Third Embodiment

Figure 5:
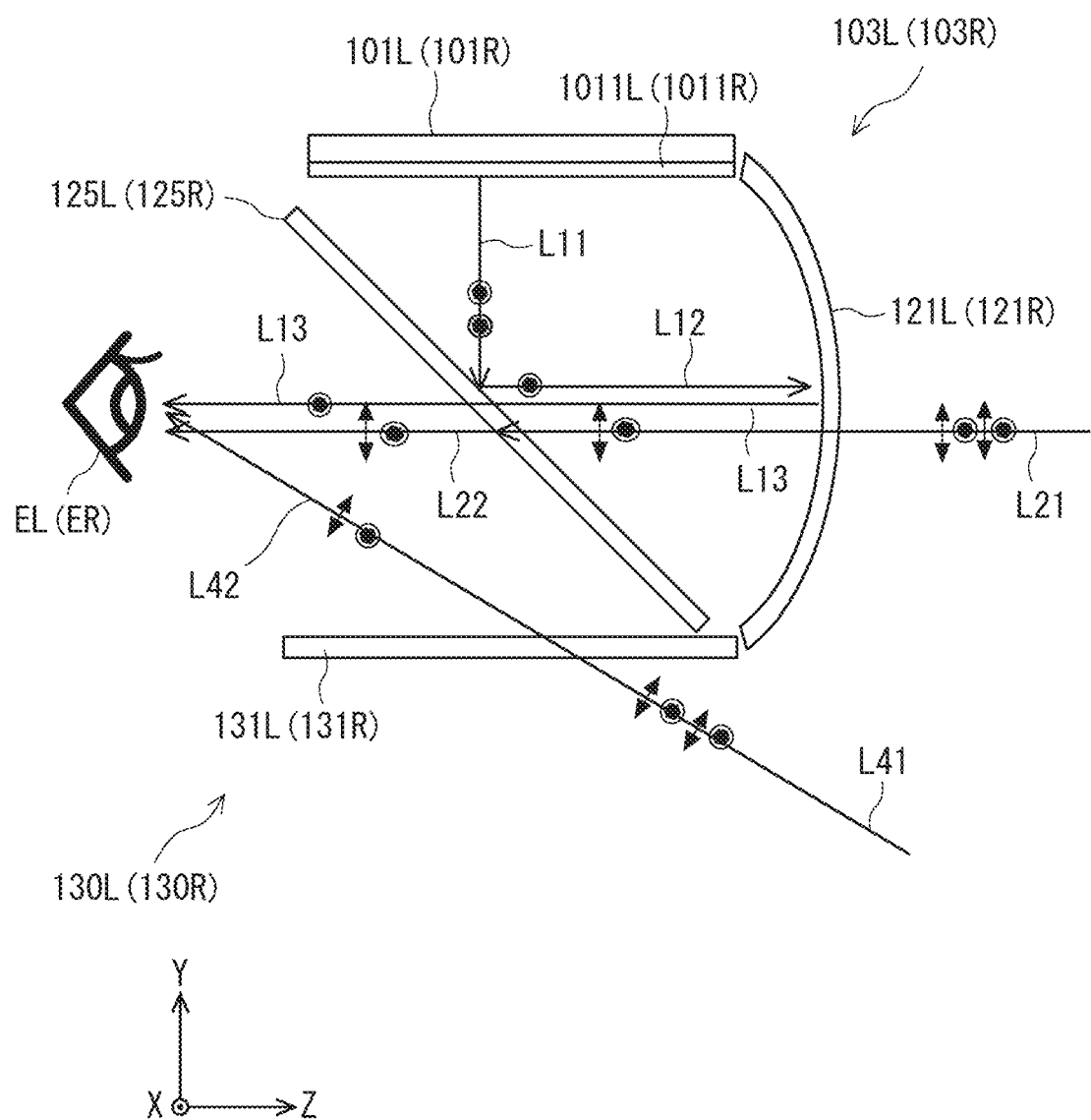
FIG. 5 is a view schematically showing the structure of an optical system of a head-mounted display according to a third embodiment.

The left-eye optical system 103L of the head-mounted display 100 according to a third embodiment is described hereinafter with reference to FIG. 5. In the third embodiment, a beam splitter 125L is used instead of the polarizing beam splitter 122L in FIG. 3. Further, the 1/4 wave plate 123L is eliminated. The elements other than these are the same as those of the first embodiment, and the description thereof is omitted.

The beam splitter 125L splits light regardless of the polarization state. For example, the beam splitter 125L is a hard mirror with transmittance Tm of 50% and reflectance of 50%. Specifically, approximately half of light incident on the beam splitter 125L passes through it and the remaining half of the light is reflected. The transmittance Tc of the combiner 121L is 50%, which is the same as in the first embodiment.

The display light L11 generated in the display element unit 101 is described hereinafter. The display light L11 is linearly polarized light that is perpendicular to the plane of paper. Approximately half of the display light L11 from the display element unit 101 is reflected in the direction toward the combiner 121L by the beam splitter 125L. Reflected light of the display light L11 that has been reflected by the beam splitter 125L is referred to as display light L12. Approximately half of the display light L12 is reflected by the combiner 121L. Reflected light of the display light L12 that has been reflected by the combiner 121L is referred to as display light L13. Approximately half of the display light L13 passes through the beam splitter 125L.

The outside light L21 from the front (+Z direction) is described hereinafter. Approximately half of the outside light L21 passes through the combiner 121L. Approximately half of the outside light L21 passes through the beam splitter 125L. Thus, the outside light L21 is attenuated to 25% by passing through the combiner 121L and the beam splitter 125L. The outside light L21 that has passed through the combiner 121L and the beam splitter 125L is referred to as outside light L22. The outside light L22 that has been attenuated to 25% enters the left eye EL.

The outside light L41 from the diagonally lower front is described hereinafter. As in the first embodiment, the light reducing unit 130L is composed of the light reducing filter 131L with transmittance of 25%. The outside light L41 is attenuated to 25% by passing through the light reducing unit 130L. The outside light L42 that has been attenuated to 25% enters the left eye EL. The brightness of a view in the front that is seen through the combiner 121L and the brightness of a view in the diagonally lower front that is seen through the light reducing unit 130L become equal. Thus, the user can see a natural view.

In the structure of this embodiment, the 1/4 wave plate 123L is not needed compared with the first and second embodiments using polarization separation. This allows reducing the number of parts.

Further, in the third embodiment also, the light reducing unit 130L may include the polarizer 132L and the light reducing filter 133L as in the second embodiment. In this case, when the polarizer 132L is an absorptive polarizing plate that absorbs linearly polarized light that is orthogonal to the plane of paper, the display light L11 that has passed through the beam splitter 125L is absorbed by the polarizer 132L. This prevents the display light L11 that has passed through the beam splitter 125L from becoming stray light.

Fourth Embodiment

Figure 6:
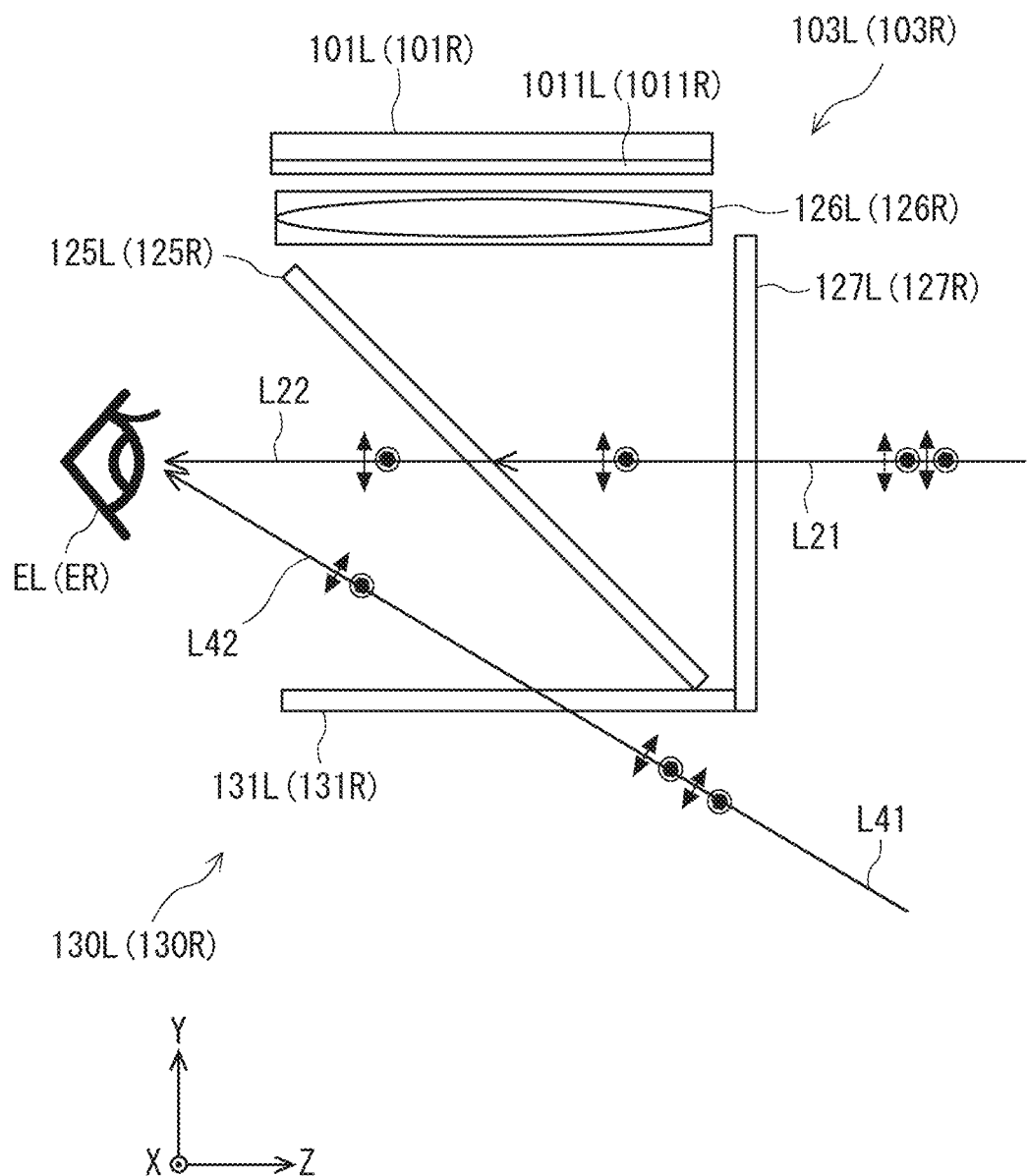
FIG. 6 is a view schematically showing the structure of an optical system of a head-mounted display according to a fourth embodiment.

The left-eye optical system 103L of the head-mounted display 100 according to a fourth embodiment is described hereinafter with reference to FIG. 6. In the fourth embodiment, the combiner 121L is a planar half-mirror 127L, not a concave half-mirror. Further, a lens unit 126L is placed in an optical path between the left-eye display element 101L and the beam splitter 125L. Note that the other elements are common to those of the third embodiment, and the description thereof is omitted as appropriate. For example, since display light L11 to L13 from the left-eye display element 101L are the same as those in the third embodiment, and the illustration thereof is omitted.

The lens unit 126L is placed directly above (on the +Y side) the beam splitter 125L. The lens unit 126L refracts display light from the left-eye display element 101L. To be specific, the lens unit 126L is a magnifying lens system that projects a magnified image of the left-eye display element 101L. Thus, a display image is formed in the same manner as in the above-described embodiment.

In this embodiment also, the light reducing unit 130L is provided as the lower window. This allows the brightness of the outside light L22 and the brightness of the outside light L42 to be equal. In the fourth embodiment also, the light reducing unit 130L may be composed of the polarizer 132L and the light reducing filter 133L as in the second embodiment. The same effects as described in the above embodiments are thereby obtained.

Fifth Embodiment

The left-eye optical system 103L of the head-mounted display 100 according to a fifth embodiment is described hereinafter with reference to FIG. 7.

In the fifth embodiment, the structure of the combiner 121L is different from that in the first embodiment. The other elements are the same as those of the first embodiment, and the description thereof is omitted as appropriate. For example, in FIG. 7, the display light L11 to L13 from the left-eye display element 101L are the same as those of the first embodiment, and the illustration of the same is omitted.

A concave half-mirror 128L that is placed in front (in the +Z direction) of the user serves as the combiner 121L. To be specific, the concave half-mirror 128L that serves as the combiner 121L lies from the position at which the upper end of the polarizing beam splitter 122L is extended in the front direction (+Z direction) to the position at which the upper end of the polarizing beam splitter 122L is extended in the downward direction (−Y direction). Specifically, the concave half-mirror 128L lies from the position on which the display light L12 from the left-eye display element 101L is incident to the position on which the outside light L41 is incident. A part of the concave half-mirror 128L located in front (in the +Z direction) of the polarizing beam splitter 122L serves as the combiner 121L. To be specific, a part of the concave half-mirror 128L on which the display light L11 is incident serves as the combiner 121L.

Further, a part of the concave half-mirror 128L serves as the light reducing unit 130L. Specifically, a part of the concave half-mirror 128L located below (in the −Y direction) the polarizing beam splitter 122L serves as the light reducing unit 130L. Further, the concave half-mirror 128L has an area size that functions not only as the combiner 121L but also as a lower window.

The light reducing unit 130L is composed of a part of the concave half-mirror 128L and the polarizer 132L. The polarizer 132L transmits p-polarized light and reflects s-polarized light. When the outside light L41 is non-polarized light, the transmittance of the polarizer 132L is 50%. The transmittance of the concave half-mirror 128L is 50%. Thus, the transmittance of the light reducing unit 130L as a whole is 25%. The outside light L41 is attenuated to 25% by passing through the light reducing unit 130L. The outside light L42 that has been attenuated to 25% enters the left eye EL.

The outside light L21 passes through the concave half-mirror 128L that functions as the combiner 121L. Further, the outside light L21 that has passed through the combiner 121L passes through the polarizing beam splitter 122L. Thus, the outside light L21 is attenuated to 25% by passing through the combiner 121L and the polarizing beam splitter 122L. The outside light L22 that has been attenuated to 25% enters the left eye EL. This allows the brightness of a view in the diagonally lower front and the brightness of a view in the front to be equal as in the first to fourth embodiments.

Figure 7:
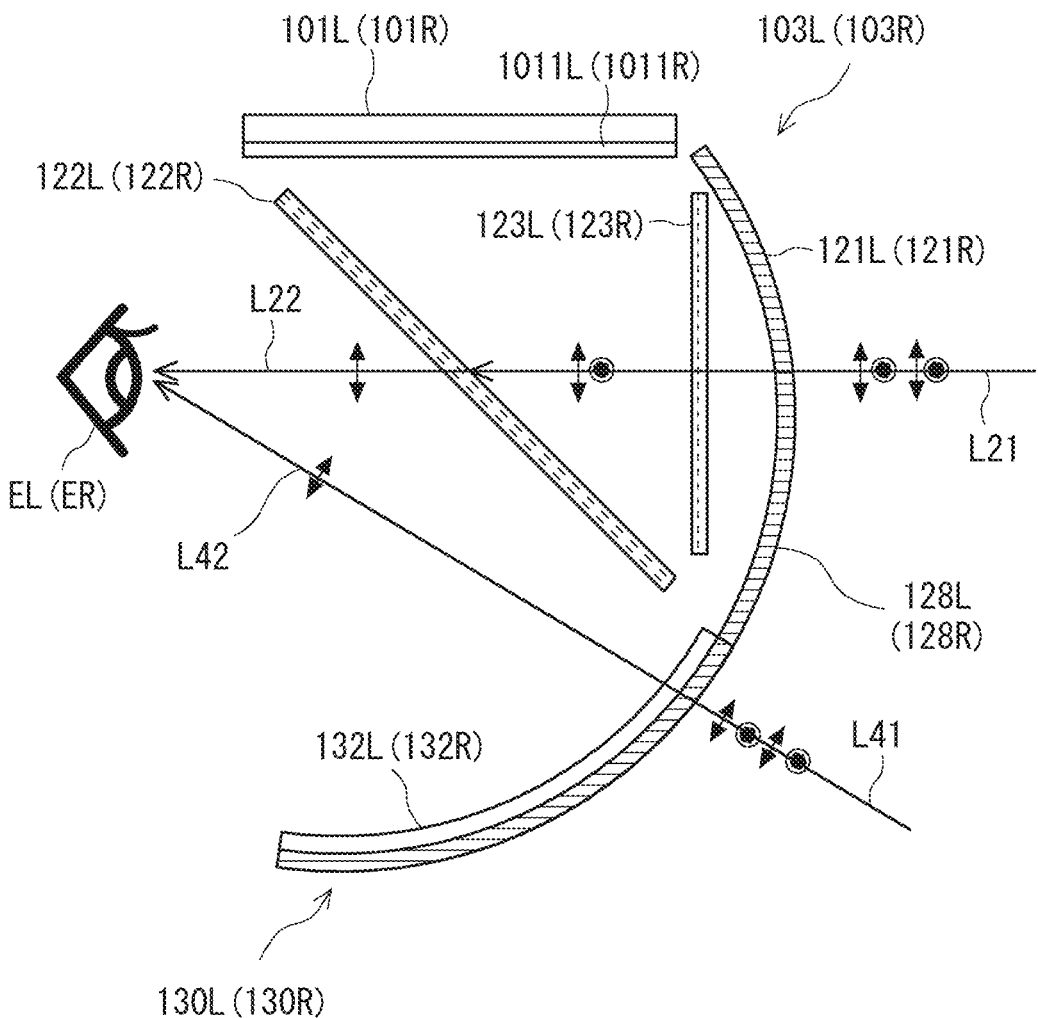
FIG. 7 is a view schematically showing the structure of an optical system of a head-mounted display according to a fifth embodiment.

It should be noted that the placement of the polarizer 132L is not limited to the structure shown in FIG. 7. For example, although the polarizer 132L is placed above (on the +Y side) the concave half-mirror 128L, which is between the concave half-mirror 128L and the polarizing beam splitter 122L, in FIG. 7, the polarizer 132L may be placed below (on the −Y side) the concave half-mirror 128L. Further, although the polarizer 132L has a curved shape along the concave half-mirror 128L in FIG. 7, it may be a flat polarizing plate as shown in FIG. 4. Furthermore, a light reducing filter with transmittance of 50% may be used instead of the polarizer 132L. The beam splitter 125L described in the third embodiment or the like may be used instead of the polarizing beam splitter 122L.

In the first to fifth embodiments, the transmittance Tw of the light reducing unit 130L, the transmittance Tc of the combiner 121L, the transmittance Tm of the polarizing beam splitter 122L, and the transmittance Tm of the beam splitter 125L are not limited to the above values. Tw, Tc and Tm may be set to any appropriate values. The transmittance Tw of the light reducing unit 130L may be any value as long as it is equal to or less than the transmittance Tc of the combiner 121L.

The value of Tw is not necessarily the same as the product of Tm and Tc. Specifically, the transmittance is set so that a difference between the brightness of the view in the diagonally lower front and the brightness of the view in the front becomes insignificant. For example, Tw may be any value equal to or less than Tc. Further, Tw may be any value equal to or less than Tm. When the product of Tm and Tc is 1, the value of Tw may be in the range of 0.7 to 1.

Sixth Embodiment

The left-eye optical system 103L of the head-mounted display 100 according to a sixth embodiment is described hereinafter with reference to FIG. 8.

In the sixth embodiment, the head-mounted display has a single mirror configuration, which is different from the first to fifth embodiments. Specifically, the polarizing beam splitter 122L or the beam splitter 125L is not provided between the left eye EL and the combiner 121L. Further, as in the fifth embodiment, a part of the concave half-mirror 128L serves as the combiner 121L, and a part of the concave half-mirror 128L serves as the light reducing unit 130L.

The angle of mounting the left-eye display element 101L is different from that in the first to fifth embodiments. The left-eye display element 101L is placed at an angle. Specifically, the display surface of the left-eye display element 101L faces downward (in the −Y direction) and forward (in the +Z direction). The display light L11 from the left-eye display element 101L is emitted in the -Y direction and in the +Z direction. The concave half-mirror 128L is placed on the lower side (in the −Y direction) and the front side (in the +Z direction) of the left-eye display element 101L. The concave half-mirror 128L lies from the position on which the display light L11 is incident to the position on which the outside light L41 is incident. The concave half-mirror 128L transmits half of light and reflects the remaining half of the light.

Thus, a part of the concave half-mirror 128L functions as the combiner 121L. The combiner 121L reflects the display light L11 from the left-eye display element 101L toward the left eye EL. The combiner 121L is a concave mirror, and reflects the display light L11 so as to focus the display light L11 toward the left eye EL. Reflected light of the display light L11 that has been reflected by the combiner 121L is referred to as display light L12. The left-eye optical system 103L guides the display light L12 from the left-eye display element 101L toward the left eye EL. The optical system can display the virtual image in front (in the +Z direction) of the user.

Further, the outside light L21 passes through the combiner 121L and enters the left eye EL. The outside light L21 that has passed through the combiner 121L is referred to as outside light L22. The transmittance of the combiner 121L is 50%. Thus, the outside light L21 is attenuated to 50% by passing through the combiner 121L. The outside light L22 that has been attenuated to 50% enters the left eye EL. This allows a display image to be superimposed on a view in the front (in the +Z direction).

The light reducing unit 130L is composed of a part of the concave half-mirror 128L. Thus, the transmittance of the light reducing unit 130L is also 50%. The outside light L41 is attenuated to 50% by passing through the light reducing unit 130L. The outside light L41 that has passed through the light reducing unit 130L is referred to as outside light L42. The outside light L42 that has been attenuated to 50% enters the left eye EL. The transmittance of the combiner 121L and the transmittance of the light reducing unit 130L are equal. Therefore, this allows the brightness of a view in the diagonally lower front and the brightness of a view in the front to be equal as in the first to fourth embodiments. Thus, the user can see the outside view properly.

Figure 8:
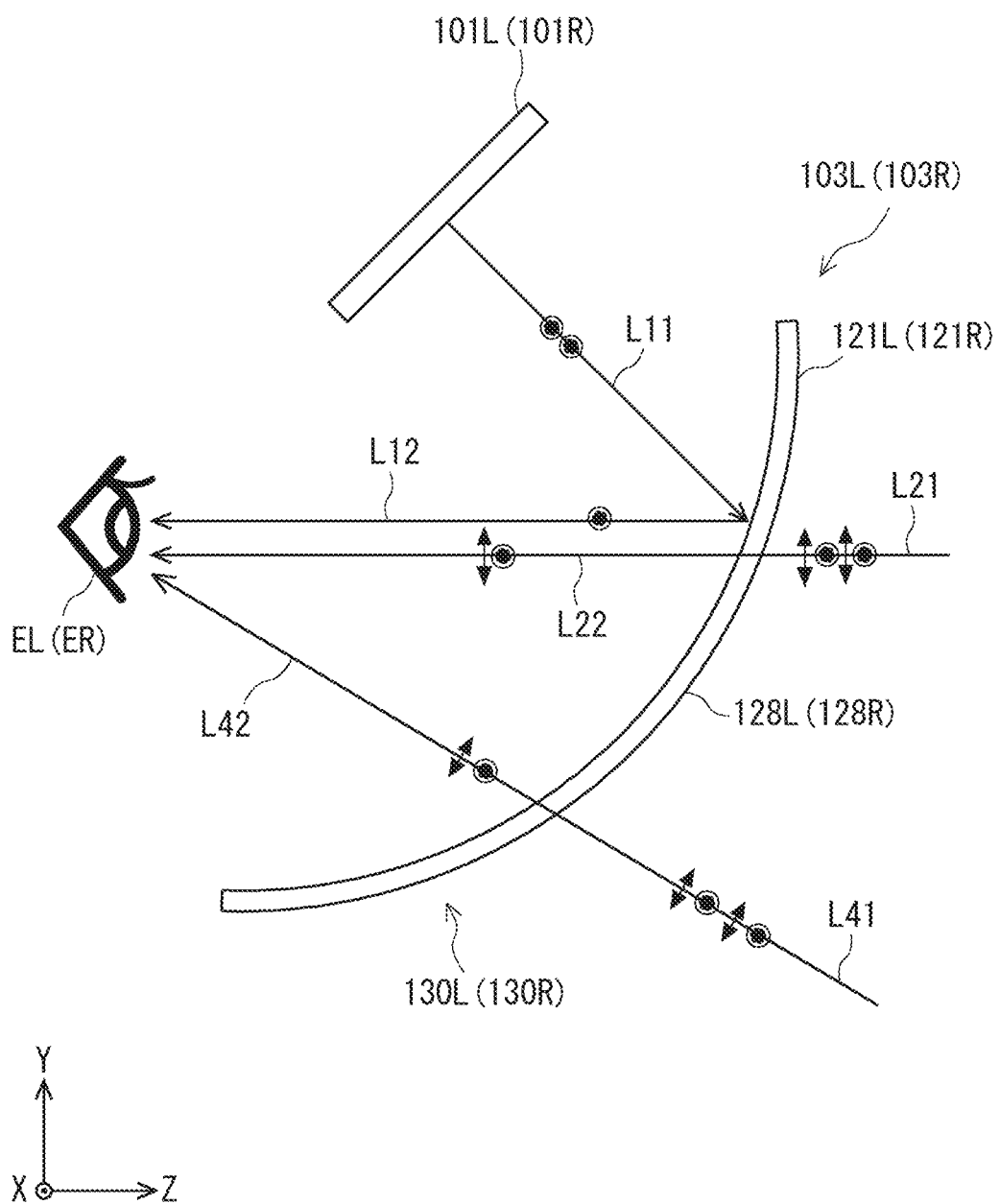
FIG. 8 is a view schematically showing the structure of an optical system of a head-mounted display according to a sixth embodiment.

Although the light reducing unit 130L is composed of the concave half-mirror 128L in FIG. 8, the light reducing unit 130L may be composed of a light reducing filter as described in the first embodiment and the like. In other words, the combiner 121L and the light reducing unit 130L may be composed of different optical parts. In this case, the light reducing filter with reflectance of 50% can be used as the light reducing unit 130L. Alternatively, the polarizer 132L may be used as the light reducing unit 130L as in the second embodiment and the like. In this case, the light reducing unit 130L is composed only of the polarizer 132L.

Seventh Embodiment

Figure 9:
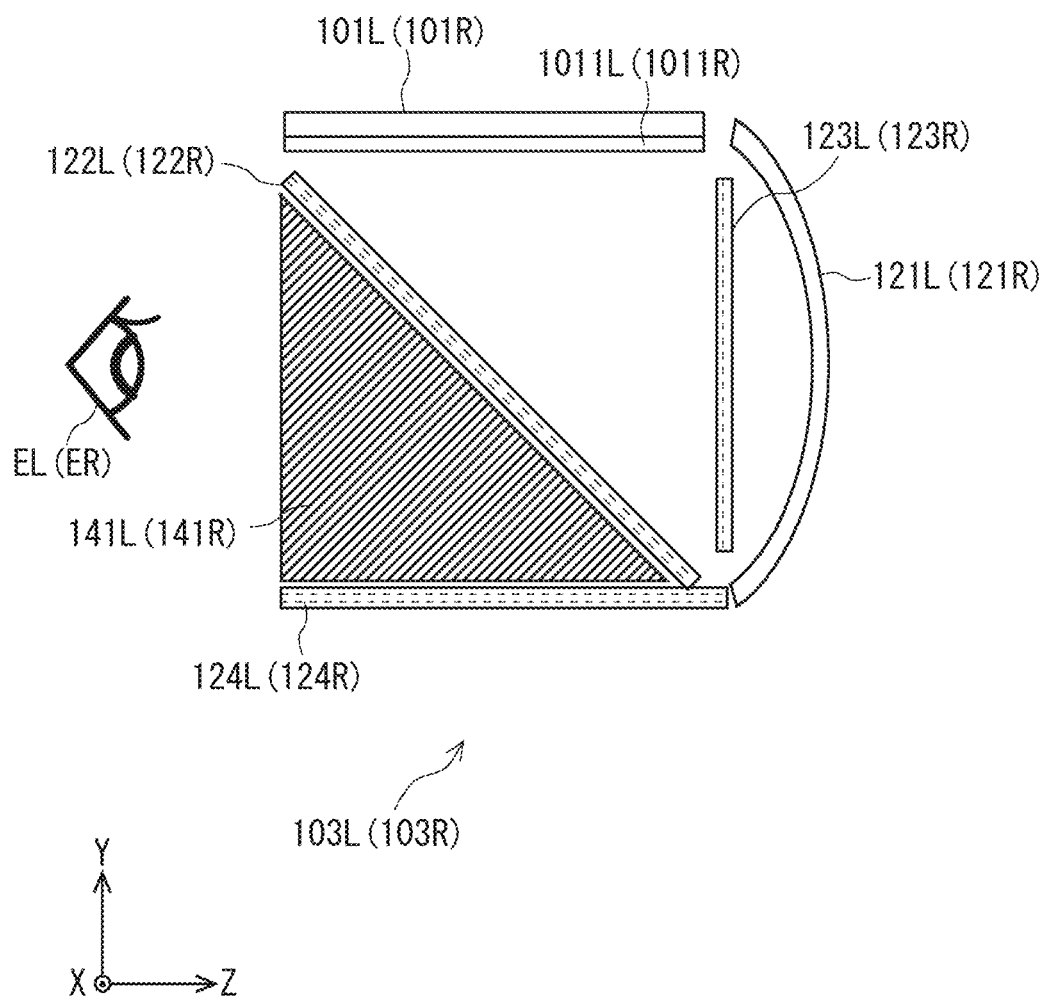
FIG. 9 is a side view schematically showing the structure of an optical system of a head-mounted display according to a seventh embodiment.
Figure 10:
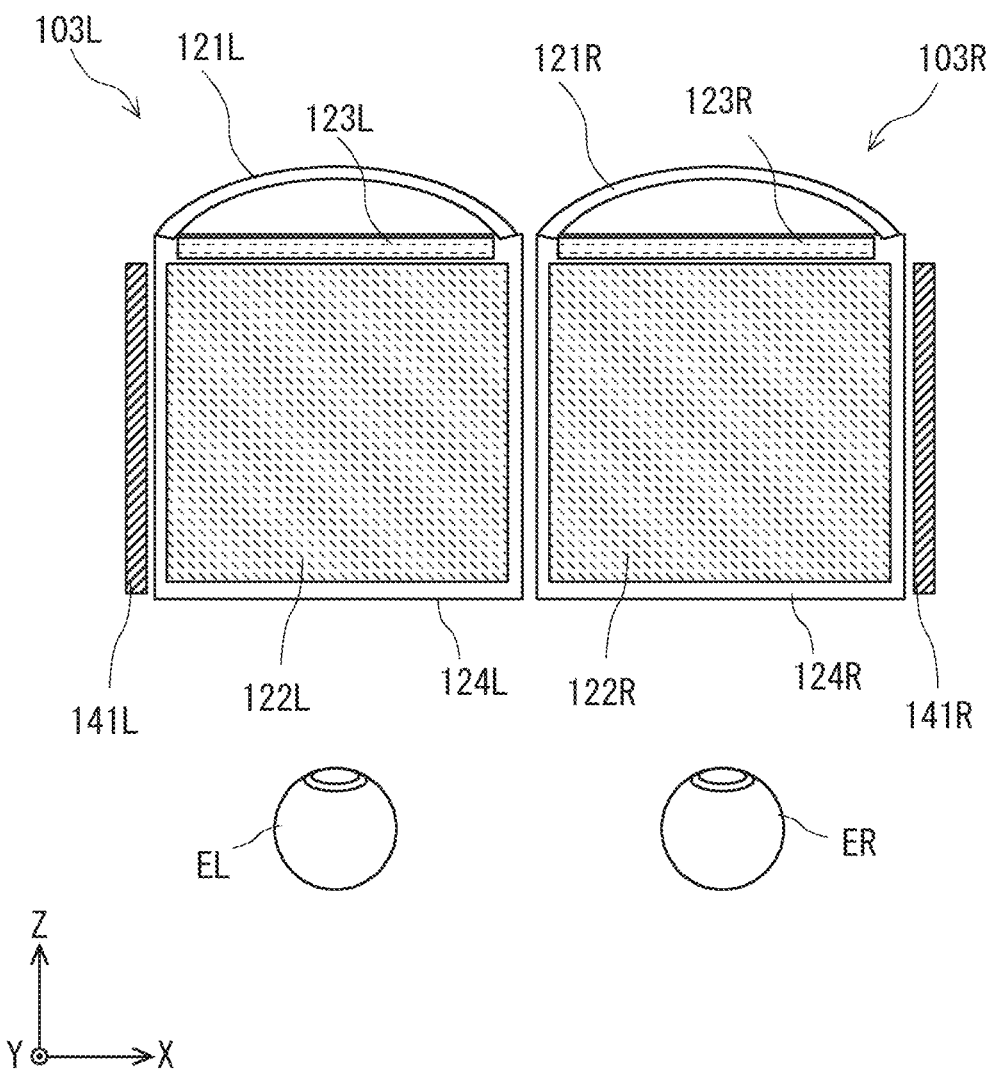
FIG. 10 is a top view schematically showing the structure of the optical system of the head-mounted display according to the seventh embodiment.

A head-mounted display according to this embodiment is described hereinafter with reference to FIGS. 9 and 10. FIG. 9 is a side view schematically showing the optical system of the head-mounted display. FIG. 10 is a top view schematically showing the optical system of the head-mounted display. In the seventh embodiment, a lateral polarizer 141L and a lateral polarizer 141R that serve as side windows are added to the structure of the first embodiment. Polarizers 124L and 124R that function as lower windows are provided instead of the light reducing unit 130L.

The basic elements other than the lateral polarizer 141L and the lateral polarizer 141R are the same as those of the first embodiment, and the description thereof is omitted. For example, the polarizers 124L and 124R are the same as the polarizers 132L and 132R, and transmit the p-polarization component and absorb the s-polarization component. The outside light and the display light are the same as those in the first and second embodiments, and therefore the illustration of the outside light and the display light is omitted in FIGS. 9 and 10. Further, to clarify the explanation, the illustration of the left-eye display element 101L and the right-eye display element 101R is omitted in FIG. 10. The lateral polarizer 141L and the lateral polarizer 141R are absorptive polarizing plates, which is the same as the polarizers 124L. The lateral polarizer 141L and the lateral polarizer 141R, however, may be reflective polarizing plates, not limited to absorptive polarizing plates.

The lateral polarizer 141L is placed on the left side (−X side) of the space between the polarizing beam splitter 122L and the polarizer 124L, on the left side surface of the head-mounted display 100. The left side surface of the head-mounted display 100 is the end face on the left side (−X side) in the head-mounted display 100. Thus, the lateral polarizer 141L is placed to form a part of the side surface of the body of the head-mounted display 100. To be specific, the lateral polarizer 141L is placed on the left side (−X side) of the polarizing beam splitter 122L and the polarizer 124L. The lateral polarizer 141L transmits linearly polarized light in the same direction as linearly polarized light which the polarizer 124L transmits. Thus, the lateral polarizer 141L transmits p-polarized light and absorbs s-polarized light.

In the Z-Y plan view, the lateral polarizer 141L is a triangle-shaped window corresponding to the tilt angle of the polarizing beam splitter 122L. The shape of the lateral polarizer 141L may be different from a triangle. The lateral polarizer 141L functions as the side window on the left side (−X side). The user can see a view on the left side (−X side) through the lateral polarizer 141L. The user thereby obtains a field of vision on the left side (−X side) of the combiner 121L.

The lateral polarizer 141R is placed on the right side (+X side) of the space between the polarizing beam splitter 122R and the polarizer 124R, on the right side surface of the head-mounted display 100. The right side surface of the head-mounted display 100 is the end face on the right side (+X side) in the head-mounted display 100. Thus, the lateral polarizer 141R is placed to form a part of the side surface of the body of the head-mounted display 100. To be specific, the lateral polarizer 141R is placed on the right side (+X side) of the polarizing beam splitter 122R and the polarizer 124R. The lateral polarizer 141R transmits linearly polarized light in the same direction as linearly polarized light which the polarizer 124R transmits. Thus, the lateral polarizer 141R transmits p-polarized light and absorbs s-polarized light.

In the Z-Y plan view, the lateral polarizer 141R is a triangle-shaped window corresponding to the tilt angle of the polarizing beam splitter 122L. The shape of the lateral polarizer 141R may be different from a triangle. The lateral polarizer 141R functions as a side window on the right side (+X side). The user can see a view on the right side (+X side) through the lateral polarizer 141R. The user thereby obtains a field of vision on the right side (+X side) of the combiner 121R.

The polarizer 124L and the lateral polarizer 141L may be formed by bending one polarizer or formed in a curved surface shape. The polarizer 124R and the lateral polarizer 141R may be formed by bending one polarizer or formed in a curved surface shape. The head-mounted display 100 does not necessarily have the structure including the polarizer 124L and the polarizer 124R, and it may include the polarizer 124L only or the polarizer 124R only.

By placing the lateral polarizers 141L and 141R on a part of the side surfaces of the body of the head-mounted display 100, a wide field of vision is obtained on both the left and right sides. This appropriately superimposes the outside light and the display light and further enhances a sense of openness.

Further, although the polarizers 124L and 124R that function as lower windows for obtaining a diagonally downward field of vision are provided in this embodiment, the light reducing units 130L and 130R may be provided as in the first to sixth embodiments.

FIGS. 3 to 10 show an example of the optical system, and the optical system is not limited to the structure shown in FIGS. 3 to 10. The optical system is not particularly limited as long as it can guide the display light from the display element unit 101 and the outside light to the left eye EL and the right eye ER. For example, a flat half-mirror can be used as the combiner 121L. In this case, a lens or the like for focusing the display light on the left eye EL may be placed between the polarizing beam splitter 122L and the left-eye display element 101L.

Although the first to seventh embodiments of the invention made by the present invention are described in the foregoing, the present invention is not restricted to the above-described embodiments, and various changes and modifications may be made without departing from the scope of the invention. The first to seventh embodiments may be combined as appropriate. For example, the light reducing units 130L and 130R may be provided in the seventh embodiment. For example, the light reducing filters 133L and 133R may be added to the structure of FIG. 9 as in the second embodiment.

The present application is applicable to a head-mounted display.

What is claimed is:

1. A head-mounted display comprising:
   a combiner configured to combine display light for forming a display image with outside light from in front of a user wearing a head-mounted display;
   a polarization beam splitter placed between the combiner and both eyes of the user, and the polarization beam splitter configured to reflect the display light toward the combiner and configured to transmit the display light reflected by the combiner, wherein the polarization beam splitter that transmits p-polarization component and reflects s-polarization component; and
   a light reducing unit placed below the polarization beam splitter and configured to transmit a part of outside light from below the combiner, transmit a same polarization component as a polarization component transmitted by the polarization beam splitter, and have a transmittance equal to or lower than a transmittance of the combiner for the polarization component.

2. The head-mounted display according to claim 1, wherein
   the transmittance of the light reducing unit is equal to or lower than a transmittance of the polarization beam splitter.

3. The head-mounted display according to claim 2, wherein
   when the transmittance of the combiner is Tc, the transmittance of the light reducing unit is Tw, and the transmittance of the polarization beam splitter is Tm, the transmittance of the light reducing unit is in a range of 0.7 to 1 when a product of Tm and Tc is 1.

4. The head-mounted display according to claim 2, wherein
   a 1/4 wave plate is placed between the polarization beam splitter and the combiner.

5. The head-mounted display according to claim 1, wherein the light reducing unit includes a polarizer.

6. The head-mounted display according to claim 1, wherein the light reducing unit includes an ND filter.

7. The head-mounted display according to claim 5, further comprising:
   a lateral polarizer placed to form a part of a side surface of a body of the head-mounted display.

* * * * *